United States Patent [19]

Davidson

[11] Patent Number: 4,893,427
[45] Date of Patent: Jan. 16, 1990

[54] TELESCOPING UNIPAD

[76] Inventor: Arthur Davidson, 3746 F. Rd., Clifton, Colo. 81520

[21] Appl. No.: 269,444

[22] Filed: Nov. 10, 1988

[51] Int. Cl.[4] .............................................. F42C 27/00
[52] U.S. Cl. ......................................... 42/94; 403/102
[58] Field of Search ............... 42/94; 89/37.04, 40.06; 403/102

[56] References Cited

U.S. PATENT DOCUMENTS

| | | | | |
|---|---|---|---|---|
| 879,052 | 2/1908 | Jeranek | | 42/94 |
| 1,112,732 | 10/1914 | Uhl | | 42/94 |
| 1,382,409 | 6/1921 | Butler | | 42/94 |
| 2,389,811 | 11/1945 | Ozlek | | 402/102 |
| 2,991,579 | 7/1961 | Lies | | 42/94 |
| 3,899,110 | 8/1975 | Binding et al. | | 403/102 |
| 4,286,353 | 9/1981 | Roche | | 403/102 |
| 4,615,637 | 10/1986 | Pelischek | | 403/102 |

FOREIGN PATENT DOCUMENTS

| | | | |
|---|---|---|---|
| 195268 | 2/1908 | Fed. Rep. of Germany | 42/94 |
| 8814 | 5/1904 | United Kingdom | 42/94 |

*Primary Examiner*—David H. Brown
*Attorney, Agent, or Firm*—Terry M. Gernstein

[57] ABSTRACT

A firearm support which can be quickly and easily set up securely supports a firearm, such as a rifle, while permitting that firearm to have freedom of movement in several planes. The support also can be stored adjacent to the firearm without tangling the shoulder strap associated with the firearm.

3 Claims, 2 Drawing Sheets

TELESCOPING UNIPAD

TECHNICAL FIELD OF THE INVENTION

The present invention relates to the general field of firearms, and to firearm supports in particular.

BACKGROUND OF THE INVENTION

With the advent of high powered rifles that are capable of hitting a target located a great distance from the shooter, and with the advent of high powered scopes that are capable of sighting such a distant target accurately, hand holding of a rifle is no longer totally acceptable.

As is well known, any inaccuracy in the hold is magnified considerably at the long ranges that modern rifles and sights are capable of achieving. As is also well known, a hand hold of a rifle may introduce inaccuracies in the hold. Therefore, while a hand hold may have many advantages and may be acceptable for short range shooting, it is not totally acceptable for the long ranges associated with the just-mentioned modern rifles and sights.

Accordingly, many designs have been proposed for adding accuracy by supporting a rifle during a shooting procedure. An example of such designs is the portable support shown in U.S. Pat. No. 4,676,021 issued on June 30, 1987 and which is intended to provide a firearm support that is readily adjustable to a desired height and readily collapsible while remaining silent in deployment and collapsing.

However, while somewhat successful in accomplishing their intended purposes, such firearm supports still do not provide sufficient stability to the firearm while also permitting rapid attachment and detachment of the device to the firearm to fully satisfy the needs of a modern rifle shooter using the high powered rifles and scopes available to him.

Still further, presently available supports do not permit complete multi-planar movement of the supported firearm, and thus inhibit the shooter somewhat. Such a restricted-movement firearm support is disclosed in U.S. Pat. No. 4,393,614 issued on July 19, 1983.

Still further, the presently available firearm supports are not totally reliable when extended and supporting the firearm. That is, once the support is fully extended and supporting a firearm, it may still tend to collapse.

Yet another problem with present devices is that they are not easily stored on the firearm in a manner that keeps them completely out of the way and prevents them from becoming tangled in a shoulder strap associated with the firearm.

All of the above-discussed deficiencies have vitiated the commercial acceptance of these devices and have prohibited them from achieving full use by shooters.

OBJECTS OF THE INVENTION

It is a main object of the present invention to provide a firearm support that is quickly and easily deployed and stored on the firearm.

It is another object of the present invention to provide a firearm support that is easily attached to the firearm.

it is another object of the present invention to provide a firearm support that is stable in its set-up configuration.

It is another object of the present invention to provide a firearm support that permits a full range of movement of the firearm in a plurality of planes.

It is another object of the present invention to provide a firearm support that is storable on the firearm in a manner that does not interfere with a shoulder strap associated with the firearm.

SUMMARY OF THE INVENTION

These, and other, objects are accomplished by a firearm support that includes an attaching means having a circular clamp member that is adapted to encircle the firearm and having a thumbscrew for attaching that clamp to the firearm, and which is mounted on an angled top member of a plurality of connected tubular members in a manner that permits movement of the attached firearm in at least two separate planes.

The attaching means includes a stirrup member and two orthogonally oriented swivel pins, and the top tubular member can be bent in two planes to avoid tangling with the shoulder strap associated with the firearm.

The secure connection of the tubular members is achieved using means such as a ball and joint connection.

Still further, the support can be stored in a doubled-up configuration by the inclusion of a hinge means that permits at least 180° movement of joined members. The joined members can include cam surfaces to permit easy set up of the support.

DETAILED DESCRIPTION OF THE PREFERRED EMBODIMENT

Figure 1:
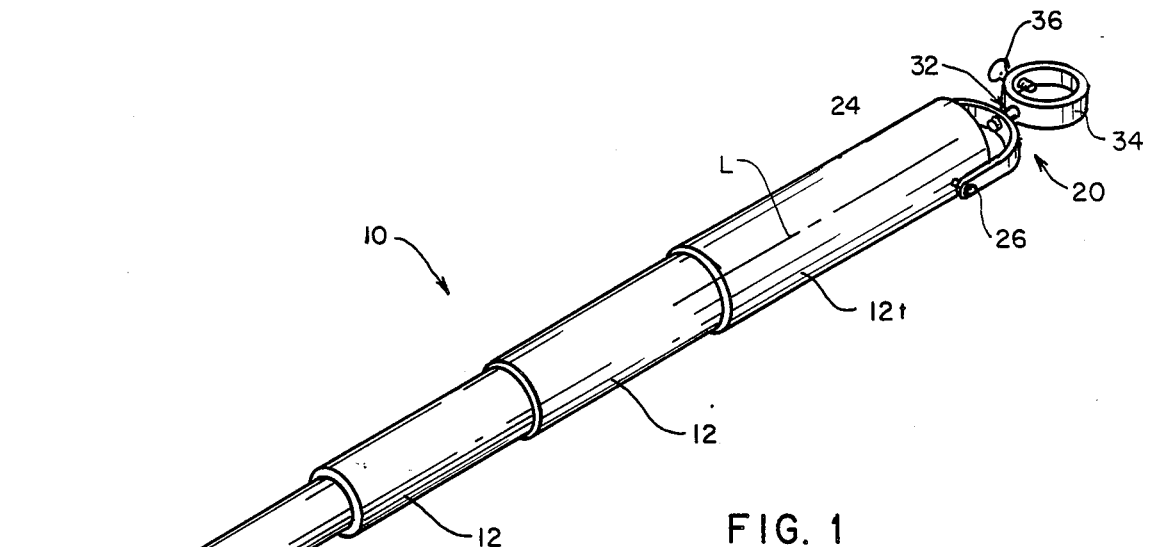
FIG. 1 is a perspective view showing the firearm support of the present invention in a fully extended configuration.

Shown in FIG. 1 is a firearm support 10 that is adapted to support a firearm, such as a high powered rifle or the like and which is adapted to support such firearm in a stable manner while still permitting a full range of movement of that firearm and easy storage and deployment of the support.

the firearm support 10 is shown in FIG. 1 as including a plurality of connected tubular members 12 which include a bottom member 12b adapted to engage a supporting surface, such as the ground or the like, and a top member 12t that is adapted to be connected to the firearm. The top member 12t has a longitudinal centerline L that will be oriented in a generally upright position when the firearm support 10 is in the set-up condition supporting a firearm, and the bottom member 12b includes a shoe or cover 14 that can be rubber or the like and which is intended to rest securely on the supporting surface. the shoe can thus include knurling-type elements 15 on the lower surface 16 thereof.

Figure 2:
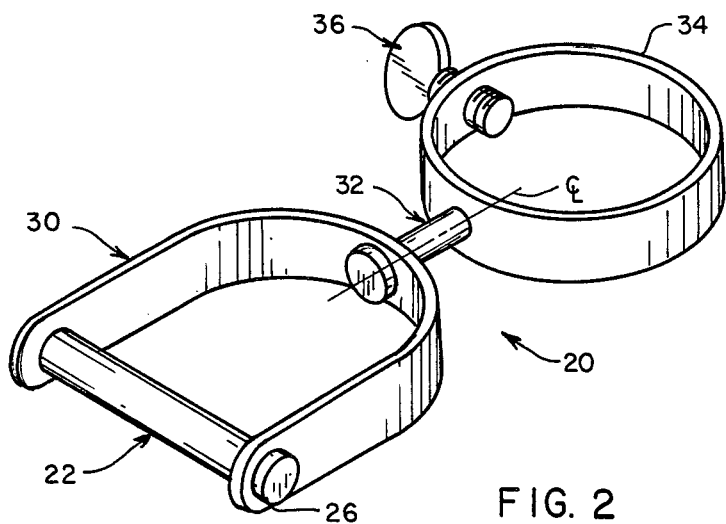
FIG. 2 is a perspective view of the attaching means for attaching the firearm support to a firearm.

The firearm support 10 is attached to the firearm by means of an attaching means 20 shown in FIG. 1 and in FIG. 2. The attaching means 20 is adapted to permit the firearm to move in at least two planes, e.g., a vertical plane and a horizontal plane, whereby the shooter is permitted full freedom in his shooting and is not restricted by the support. The attaching means 20 includes a first swivel pin 22 that is attached to the top tubular member 12t via holes defined in that top member 12t near the top end 24 thereof, and extends transversely across the longitudinal centerline of the top member 12t. The swivel pin 22 has a longitudinal dimension that is selected to be greater than the outer diameter of the top member 12t so that the ends of the swivel pin 22 extend out of the member 12t to define attaching ears, such as attaching ear 26 shown in FIG. 1.

A U-shaped stirrup 30 is attached to the attaching ears 26 in a manner that permits pivoting of the stirrup transverse to the top member longitudinal centerline L and which permits the stirrup to move over the top end 24 of the member 12t. Such pivoting movement provides the firearm with the ability to move in a vertical plane.

A second swivel pin 32 is attached to the stirrup 30 to extend orthogonally with respect to the first swivel pin 22. The second swivel pin 32 is attached to the stirrup to rotate about the longitudinal centerline CL of the second swivel pin. The second swivel pin 32 is mounted on the stirrup to have its longitudinal centerline CL adapted to be colinear with the longitudinal centerline L of the top tubular member whereby the second swivel pin can rotate about such centerline L when the support 10 is in the configuration shown in FIG. 1.

a circular clamp member 34 is attached to the second swivel pin 32 to rotate about the centerline CL whereby, in the configuration shown in FIG. 1, the clamp member 34 will rotate about the centerline L thereby providing movement of the firearm in a horizontal plane. The clamp member is generally circular and is sized and adapted to encircle the barrel of the firearm. The clamp member 34 includes a means for attaching the clamp member to that firearm, and such means is shown in FIG. 2 as including a thumbscrew 36 threadably mounted on the clamp member 34 for movement into and out of the perimeter of that clamp member.

Figure 3:
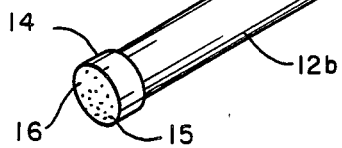
FIG. 3 is a perspective view of a support mounting means for releasably attaching the firearm support to a firearm.

As will be understood by one skilled in the art, the firearm support 10 is attached to a firearm by the attaching means 20 and can be stored adjacent to that firearm because the attaching means will adopt a configuration having the clamp member 34 at right angles with respect to the position shown therefor in FIG. 1 since the means 20 can pivot about first swivel pin 22 90° from the position shown in FIG. 1.

the support 10 can be releasably attached to the firearm by means of a support mounting means 40, best shown in FIG. 3. The mounting means 40 includes a U-shaped body 42 having a bight portion 44 with a fastener means 46 thereon for affixing the mounting means 40 to the firearm. As shown in FIG. 3, the fastener means 46 includes a bore that is internally threaded to co-operate with a threaded fastener mounted on the firearm. The mounting means 40 further includes legs 44 that are internally shaped and sized to receive and securely hold one of the tubular members. The legs 44 are flexible so that the tubular member can be forced between the legs to be held therein.

Figure 4:
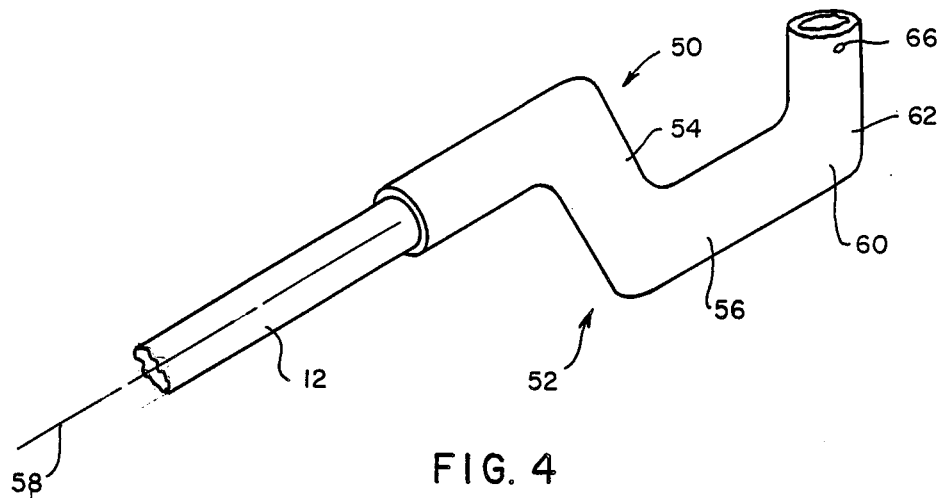
FIG. 4 is a perspective view of a top member of the plurality of tubular members in a configuration that is bent in two planes to avoid tangling the support with a shoulder strap associated with the firearm.

In order to prevent the firearm support 10 from tangling with a shoulder strap associated with the firearm, the support 10 can include a double bent top member 12t' as shown in FIG. 4. As shown in FIG. 4, the top member 12t' is bent in two planes, and includes a first bend 50 and a second bend 52 connecting a first section 54 and a second section 56. The first bend 50 also connects the first section 54 to a connection section 57 which is mounted on a tubular member 12 as shown in FIG. 4. The bends 50 and 52 and the sections 54 and 56 are in the same plane and offset the section 56 from the centerline 58 of the remaining tubular members in that plane. The top member 12t' further includes a third bend 60 connecting the section 56 to a third section 62 to which the attaching means 20 is mounted via holes, such as hole 66 shown in FIG. 4. The bend 60 orients the section 62 that is upright and thus at an angle with respect to the plane containing section 56 so that the section 62 is offset with respect to the centerline 58 and is oriented at a right angle with respect to that centerline 58. Thus, in the configuration of the support 10 shown in FIG. 1, the just-discussed bends will offset the section 62 and orient that section vertically to the horizontal orientation shown for the remainder of the tubular members. As is also indicated in FIG. 4, the third section 62 includes an outer surface 63 out of which the first swivel pin 22 extends to define attachment ears 26 as above discussed with regard to FIGS. 1 and 2.

Figure 5:
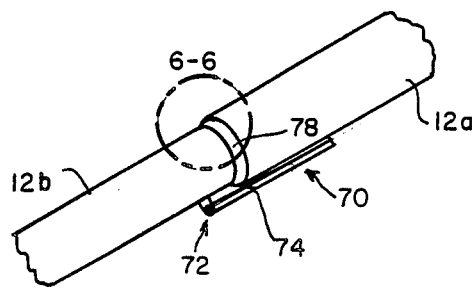
FIG. 5 is a perspective view of a coupling between adjacent tubular members of the firearm support, and shows a hinge means for permitting such adjacent members to move 180° with respect to each other.

To provide still more flexibility to a two member support, a system can be used so the two tubular members can be folded. Such a system is shown in FIG. 5 as hinge 70 mounted on one tubular member by a pivot means 72 and having a flange 74 attached to an adjacent tubular member. The hinge is adapted to provide the flange 74 with the ability to move 180° from the position shown in FIG. 5 whereby the two tubular members shown in FIG. 5 can be located adjacent to each other in a side-by-side relationship.

Figure 6:
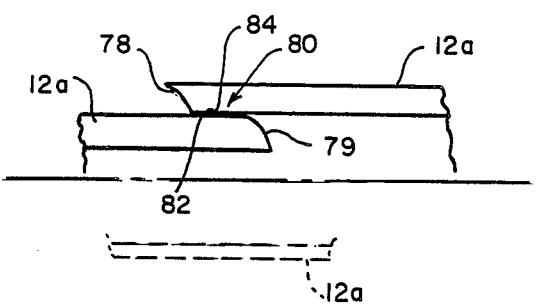
FIG. 6 is an enlarged view of area 6—6 of FIG. 5 and which shows a snap-joint coupling between adjacent tubular members along with the co-operatingly shaped and sized cam surfaces on such adjacent members.

To facilitate the interengaging of the tubular members, each tubular member includes a cam surface 78 that is shaped and sized to co-operate with a cam surface 79 on the adjacent tubular member. The co-operating cam surfaces 78 and 79 are best shown in FIG. 6, and it can be seen that the surface 78 will engage the cam surface 79 in such a manner as to permit the cam surface 78 to slide over the cam surface 79 as the tubular member 12a is moved into the FIG. 6 position with respect to tubular member 12b from a position indicated in FIG. 6 by the phantom lines.

A snap joint 80 is also included on each tubular member to releasably and securely couple adjacent tubular members together. Each tubular member includes a ball 82, that preferably is formed of plastics type material, such as Teflon, on one end thereof, and a dimple 84 on the other end thereof. The ball snaps into the dimple to couple the two members together.

It is to be understood that while certain forms of the present invention have been illustrated and described herein, it is not to be limited to the specific forms or arrangement of parts described and shown.

I claim:

1. A firearm support comprising:

(A) a plurality of telescopically engaged tubular members which include a bottom member adapted to rest on a support surface and a double-bent top member adapted to be attached to a firearm, said double-bent top member including a connecting section mounted on one of said tubular members, a first section oriented at an angle with respect to said connecting section and being in a common plane with said connecting section, a first bend connecting said connecting section to said first section, a second section oriented at an angle with respect to said first section and being in said common plane with said first section and said connecting section, a second bend connecting said first section to said second section, a third section oriented at an angle with respect to said second section and being in a second plane that is oriented at an angle with respect to said common plane, and a third bend connecting said third section to said second section, said third section having an outer surface and an end spaced from said third bend;

(B) an attaching means on said top member third section for attaching said top member to a firearm, said attaching means including (1) a swivel pin mounted on said top member third section adjacent to the end of said top member third section and extending outwardly of said third section outer surface to define attaching ears, (2) a U-shaped stirrup attached to said swivel pin attaching ears and mounted thereon to pivot around the end of said top member third section, (3) a second swivel pin affixed to said stirrup, and (4) a circular clamp member attached to said second swivel pin to rotatable about said second swivel pin, said clamp member being adapted to encircle the firearm and having a thumbscrew for engaging the firearm to attach said clamp member to the firearm.

2. The firearm support defined in claim 1 further including a support mounting means affixed to the firearm, said support mounting means including a U-shaped body having a bight portion which is mounted on the firearm and a pair of legs attached to said bight portion and being sized and shaped to correspond to the size and shape of one tubular member said tubular members for partially encircling said one tubular member and releasably attaching said one tubular member to the firearm.

3. The firearm support defined in claim 1 further including a cover on a bottom of said bottom member.

* * * * *